US010456645B2

(12) United States Patent
Joo et al.

(10) Patent No.: US 10,456,645 B2
(45) Date of Patent: Oct. 29, 2019

(54) BASEBALL PRACTICE APPARATUS, SENSING DEVICE AND SENSING METHOD UTILIZED THEREBY, AND METHOD FOR CONTROLLING BALL PITCHING

(71) Applicant: NEWDIN CONTENTS CO., LTD., Seoul (KR)

(72) Inventors: Sang Hyun Joo, Daejeon (KR); Se Hwan Kim, Daegu (KR); Bong Kyung Ko, Daejeon (KR)

(73) Assignee: NEWDIN CONTENTS CO., LTD., Seoul (KR)

(*) Notice: Subject to any disclaimer, the term of this patent is extended or adjusted under 35 U.S.C. 154(b) by 0 days.

(21) Appl. No.: 15/781,480

(22) PCT Filed: Dec. 16, 2016

(86) PCT No.: PCT/KR2016/014773
§ 371 (c)(1),
(2) Date: Jun. 5, 2018

(87) PCT Pub. No.: WO2017/105120
PCT Pub. Date: Jun. 22, 2017

(65) Prior Publication Data
US 2018/0353822 A1    Dec. 13, 2018

(30) Foreign Application Priority Data

Dec. 18, 2015    (KR) .................. 10-2015-0181652

(51) Int. Cl.
*A63B 24/00*    (2006.01)
*A63B 69/00*    (2006.01)
(Continued)

(52) U.S. Cl.
CPC .......... *A63B 69/0002* (2013.01); *A63B 24/00* (2013.01); *A63B 24/0003* (2013.01);
(Continued)

(58) Field of Classification Search
CPC ... A63B 69/0002; A63B 24/00; A63B 24/003; A63B 24/0021; A63B 2069/0008;
(Continued)

(56) References Cited

U.S. PATENT DOCUMENTS 6,042,492 A * 3/2000 Baum ................ A63B 24/0003
434/257
7,575,526 B2 * 8/2009 Husband ............ A63B 24/0021
473/422
(Continued)

FOREIGN PATENT DOCUMENTS

JP    2014-217468 A    11/2014
KR    20-0269859 Y1    3/2002
(Continued)

OTHER PUBLICATIONS

International Search Report for PCT/KR2016/014773 dated Feb. 28, 2017 from Korean Intellectual Property Office.

*Primary Examiner* — Corbett B Coburn
(74) *Attorney, Agent, or Firm* — Revolution IP, PLLC

(57) ABSTRACT

A baseball practice apparatus includes: a ball pitching device configured to pitch a ball toward a batting area where a user bats; a detection sensor configure to sense whether the user is located in the batting area; and a control device configured to analyze sensing information of the detection sensor to determine whether the user has prepared for batting in the batting area and cause the ball pitching device to operate according to a preset process when it is determined that the user has prepared for batting.

17 Claims, 6 Drawing Sheets

(51) Int. Cl.
*G06T 7/70* (2017.01)
*G06T 7/11* (2017.01)
*G06T 7/12* (2017.01)

(52) U.S. Cl.
CPC ............ *A63B 24/0021* (2013.01); *G06T 7/11* (2017.01); *G06T 7/12* (2017.01); *G06T 7/70* (2017.01); *A63B 2069/0008* (2013.01); *G06T 2207/30196* (2013.01); *G06T 2207/30221* (2013.01)

(58) Field of Classification Search
CPC ..... G06T 7/12; G06T 7/11; G06T 7/70; G06T 2207/30196; G06T 2207/30221
See application file for complete search history.

(56) References Cited

U.S. PATENT DOCUMENTS

| | | | | |
|---|---|---|---|---|
| 8,979,548 B2* | 3/2015 | Guttler | ................ | A63B 69/002 434/247 |
| 9,233,294 B1* | 1/2016 | Coyle | ................ | A63B 71/0605 |
| 9,308,426 B2* | 4/2016 | Thurman | ........... | A63B 71/0605 |
| 2001/0056000 A1* | 12/2001 | Hori | ....................... | A63B 63/00 473/453 |
| 2003/0158004 A1* | 8/2003 | Leal | ................... | A63B 69/0002 473/451 |
| 2006/0287137 A1* | 12/2006 | Chu | ..................... | A63B 47/025 473/422 |
| 2012/0108367 A1* | 5/2012 | Betances | ............ | A63B 69/0002 473/452 |
| 2014/0004967 A1 | 1/2014 | Jang et al. | | |
| 2016/0279496 A1* | 9/2016 | Lee | ..................... | G06Q 10/0639 |
| 2016/0279526 A1* | 9/2016 | Lee | ........................ | A63F 13/812 |
| 2016/0339316 A1 | 11/2016 | Lee et al. | | |

FOREIGN PATENT DOCUMENTS

| | | |
|---|---|---|
| KR | 10-0411754 B1 | 12/2003 |
| KR | 10-0919371 A | 9/2009 |
| KR | 10-2011-0035419 A | 4/2011 |
| KR | 10-1048089 B1 | 7/2011 |
| KR | 10-2012-0139415 A | 12/2012 |
| KR | 10-2014-0100685 A | 8/2014 |
| KR | 10-1505931 B1 | 3/2015 |
| KR | 10-1543371 B1 | 8/2015 |
| KR | 10-2015-0127531 A | 11/2015 |
| KR | 10-1572526 B1 | 12/2015 |

* cited by examiner

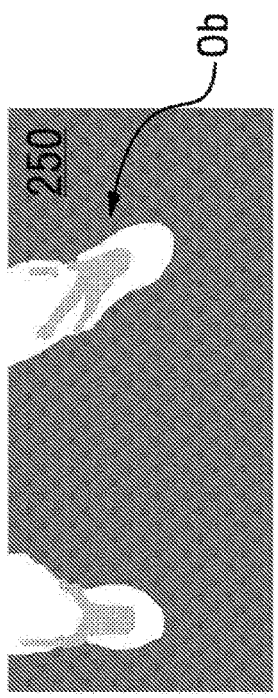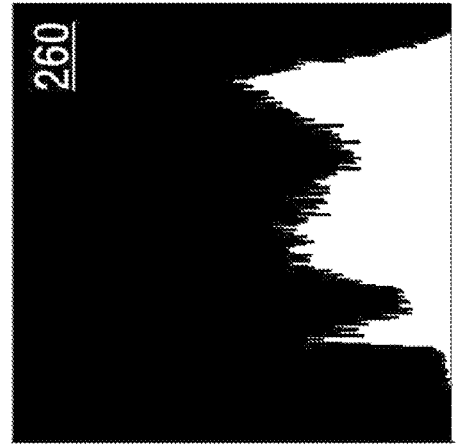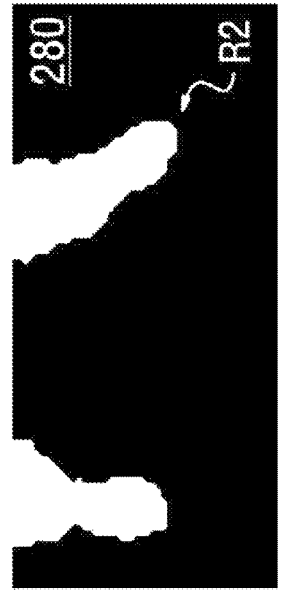
FIG. 5

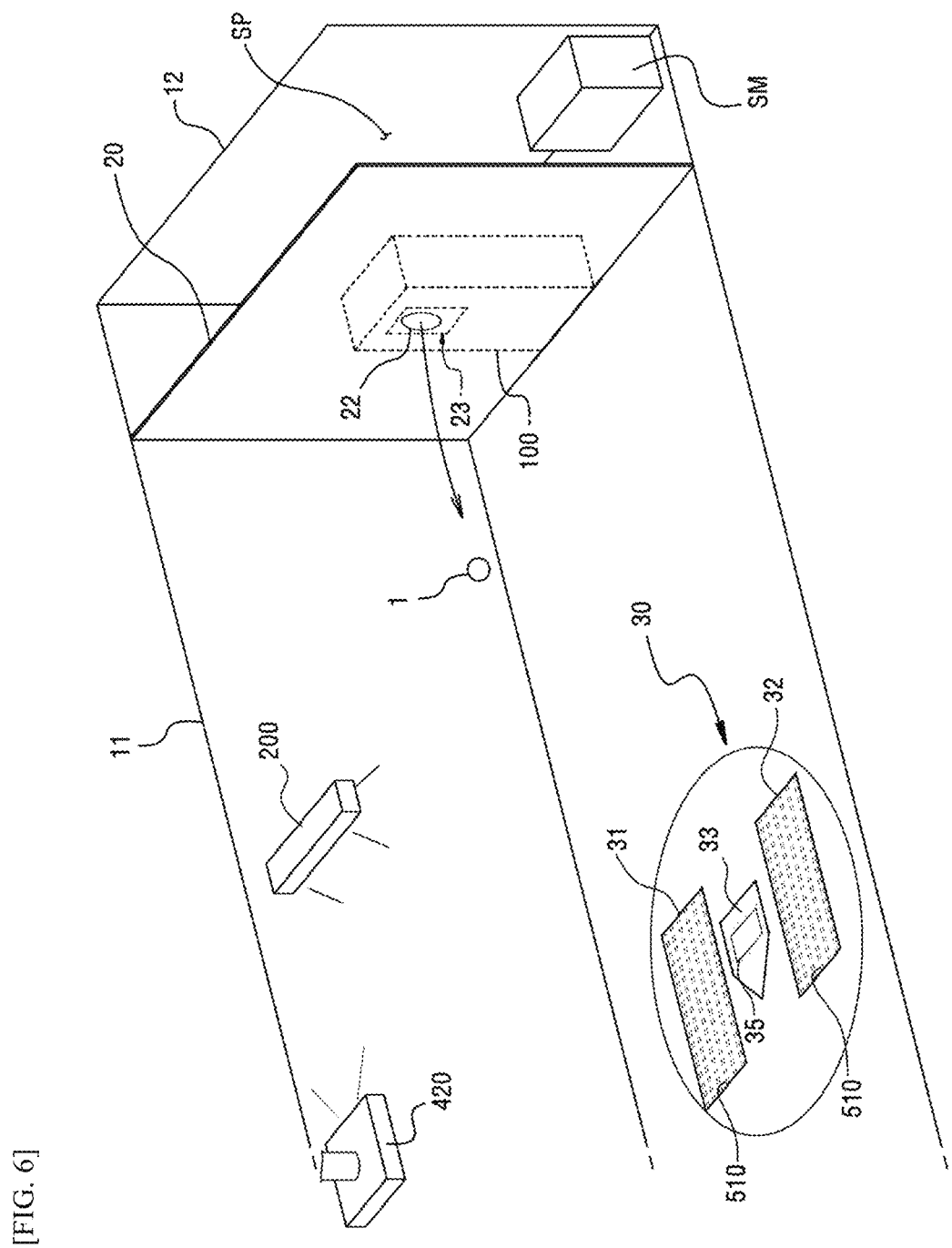
[FIG. 6]

BASEBALL PRACTICE APPARATUS, SENSING DEVICE AND SENSING METHOD UTILIZED THEREBY, AND METHOD FOR CONTROLLING BALL PITCHING

TECHNICAL FIELD

The present invention relates to a baseball practice apparatus allowing a user to hit a ball fired by a ball pitching device with a bat or a baseball practice apparatus such as a screen baseball system that allows a user to hit a ball fired by a ball pitching device in an indoor space of a predetermined size, senses hitting through a sensing device, and implements a simulation image according to the sensing result, a sensing device and sensing method used therefor, and a method for controlling ball pitching.

BACKGROUND ART

With the recent increase in population enjoying baseball, a so-called screen baseball system has emerged that overcomes the limitations of playing baseball in a wide baseball stadium and allows people to enjoy playing a virtual baseball game in a small indoor space while experiencing virtual reality.

Typically, a screen baseball system is installed in an indoor space and has a batter's box with a space of a predetermined size where a user can bat and a screen capable of displaying a virtual baseball field. When a pitching machine installed on the back of the screen pitches a ball toward the batter's box, a user preparing to hit the ball in the batter's box hits the ball pitched by the pitching machine. At this time, a sensing device senses movement of the pitched ball and movement of the ball hit by the user. Then, based on the result of sensing, it is determined whether the pitch is a ball or strike, and a simulation image of the trajectory of the hit ball is implemented on the screen.

In addition to the screen baseball system described above, various baseball practice apparatuses allowing the user in the batter's box to practice batting by hitting a ball pitched by a pitching machine are widely used.

Whether it is the screen baseball system described above or the baseball practice system for simple batting practice, the pitching machine in the system conventionally shoots a ball toward the batter's box when a user who is preparing to bat in the batter's box operates the fire switch installed in the batter's box.

In this regard, prior art documents such as Korean Patent Application No. 10-2014-0054105, Korean Patent Application No. 10-2015-0041861, and Korean Patent Application No. 10-2013-0013688 disclose pitching a ball by a user's operation of a fire switch in the baseball practice system or the screen baseball system described above.

However, firing a ball by operation of the fire switch as disclosed in the conventional art causes inconvenience by requiring the user, who needs to concentrate on batting, to operate the switch, and significantly reduces immersion in baseball practice. Further, this method raises issues regarding malfunction and durability of the fire switch.

DISCLOSURE

Technical Problem

Therefore, it is an object of the present invention to provide a baseball practice apparatus for baseball practice or a baseball game that senses preparation for batting made by a user who positions himself in the batter's box to bat and automatically proceeds with the baseball practice or the baseball game even if the user does not operate a separate switch, a sensing device and sensing method used therefor, and a method for controlling ball pitching.

Technical Solution

In accordance with the present invention, the above and other objects can be accomplished by the provision of a baseball practice apparatus including a ball pitching device configured to pitch a ball toward a batting area where a user bats, a detection sensor configure to sense whether the user is located in the batting area, and a control device configured to analyze sensing information of the detection sensor to determine whether the user has prepared for batting in the batting area and cause the ball pitching device to operate according to a preset process when it is determined that the user has prepared for batting.

In accordance with another aspect of the present invention, there is provided a baseball practice apparatus for allowing a user to practice baseball or play a game of baseball based on a virtual baseball image, the baseball practice apparatus including a ball pitching device configured to pitch a ball toward a batting area where a user bats, a sensing device configured to calculate ball motion information about at least one of a ball pitched by the ball pitching device and a ball hit by the user by acquiring and analyzing an image of a predetermined photographing range including the batting area and to perform an image analysis of the acquired image according to preset conditions to determine whether the user has prepared for batting in the batting area, and a control device configured to implement a simulation image of ball motion based on the ball motion information calculated by the sensing device and to proceed with the baseball practice or the game of baseball when the sensing device determines that the user has prepared to bat.

In accordance with another aspect of the present invention, there is provided a baseball practice apparatus for allowing a user to practice baseball or play a game of baseball based on a virtual baseball image, the baseball practice apparatus including a ball pitching device configured to pitch a ball toward a batting area where a user bats, a sensing device configured to calculate ball motion information about at least one of a ball pitched by the ball pitching device and a ball hit by the user by acquiring and analyzing an image of a predetermined photographing range, a detection sensor configure to sense whether the user is located in the batting area, and a control device configured to implement a simulation image of ball motion based on the ball motion information calculated by the sensing device, determine whether or not the user has prepared to bat in the batting area according to a result of the sensing of the detection sensor or the sensing device, and proceed with the baseball practice or the game of baseball upon determining that the user has prepared to bat.

In accordance with another aspect of the present invention, there is provided a sensing device used in a baseball practice apparatus configured to calculate ball motion information about at least one of a ball pitched by the ball pitching device and a ball hit by a user by acquiring and analyzing an image of a predetermined photographing range including a batting area where the user bats and to be used for a baseball practice apparatus configured to implement a simulation image of ball motion based on the calculated ball motion information, the sensing device including a camera unit configured to successively acquire an image of the predetermined photographing range including the batting area, and a sensing processor configured to receive an image from the camera unit and perform an image analysis of the image according to preset conditions to determine whether or not the user has prepared to bat in the batting area, wherein the sensing processor determines that the user has prepared to bat and generates a ready signal such that a control device of the baseball practice apparatus causes a pitching image of a virtual pitcher to be implemented and an operation to be performed according to a preset process of the ball pitching device.

In accordance with another aspect of the present invention, there is provided a method of controlling ball pitching of a baseball practice apparatus allowing a user to practice baseball or play a game of baseball in a manner that the user hits a ball pitched by a ball pitching device based on a virtual baseball image, the method including successively acquiring, by a sensing device configured to sense ball motion, an image of a predetermined photographing range including a batting area where the user bats, determining, by the sensing device, whether or not the user has prepared to bat in the batting area by performing an image analysis of the acquired image according to preset conditions, and generating a ready signal for driving the ball pitching device when it is determined through the image analysis that the user has completed preparation for batting.

In accordance with another aspect of the present invention, there is provided a method of controlling ball pitching of a baseball practice apparatus allowing a user to practice baseball or play a game of baseball in a manner that the user hits a ball pitched by a ball pitching device based on a virtual baseball image, the method including successively acquiring an image of a predetermined photographing range including a batting area, the batting area including a batter's box where a user is positioned to bat and a home base having a light emitting means, sensing, by a detection sensor provided to the batter's box, whether the user is located in the batter's box, when the detection sensor sensed the user being located in the batter's box, emitting light by the light emitting means of the home base, and sensing, by the detection sensor, the light emitting means of the home base emitting light by analyzing the successively acquired image, and determining whether the user has completed preparation for batting based on information sensed through the analysis of the image and generating a ready signal for operating the ball pitching device.

In accordance with a further aspect of the present invention, there is provided a sensing method of a sensing device used in a baseball practice apparatus configured to calculate ball motion information about at least one of a ball pitched by the ball pitching device and a ball hit by a user by acquiring and analyzing an image of a predetermined photographing range including a batting area where the user bats and to be used for a baseball practice apparatus configured to implement a simulation image of ball motion based on the calculated ball motion information, the method including successively acquiring an image of the predetermined photographing range including the batting area, and performing an image analysis of the acquired image according to preset conditions and determining whether or not the user has prepared to bat in the batting area, and sending a ready signal to a control device of the baseball practice apparatus when it is determined that the user has prepared to bat.

Advantageous Effects

According to the baseball practice apparatus, the sensing device and sensing method used therefor, and the ball pitching control method of the present invention, the baseball practice apparatus for baseball practice or a baseball game senses preparation for batting made by a user who positions himself in the batter's box and automatically proceeds with the baseball practice or the baseball game even if the user does not operate a separate switch. Thereby, convenience may be improved for the user who practices baseball or plays a game of baseball, and immersion in the game may also be improved.

DESCRIPTION OF DRAWINGS

FIG. 5 shows (a) an example of a detection area extracted from an image acquired by a sensing device used in a baseball practice apparatus according to an embodiment of the present invention, (b) an example of histogram analysis information about a detection area image, (c) a detected image edge of the detection area image, and (d) a detected contour of an object in the detection area image.

FIG. 6 shows an example of a virtual baseball simulation system implemented as a baseball practice apparatus according to another embodiment of the present invention.

BEST MODE

A more detailed description of a baseball practice apparatus, a sensing device and a sensing method therefor, and a ball pitching control method according to the present invention will be described with reference to the drawings.

In the detailed description of the present invention below, the "baseball practice apparatus" according to the present invention conceptually includes both a baseball practice system in which a pitching machine pitches a ball to allow batting practice and a user hits the pitched ball in a batter's box, and a screen baseball system which is installed in an indoor space, has a batter's box with a space of a predetermined size where a user can bat and a screen capable of displaying a virtual baseball field, and is operated in a manner that, when the pitching machine pitches a ball toward the batter's box, a user preparing to hit the ball in the batter's box hits the ball pitched by the pitching machine, the sensing device senses the movement of the pitched ball and the movement of the ball hit by the user, and a simulation image of the trajectory of the hit ball is implemented on the screen. Hereinafter, the present invention will be described in detail.

Figure 1:
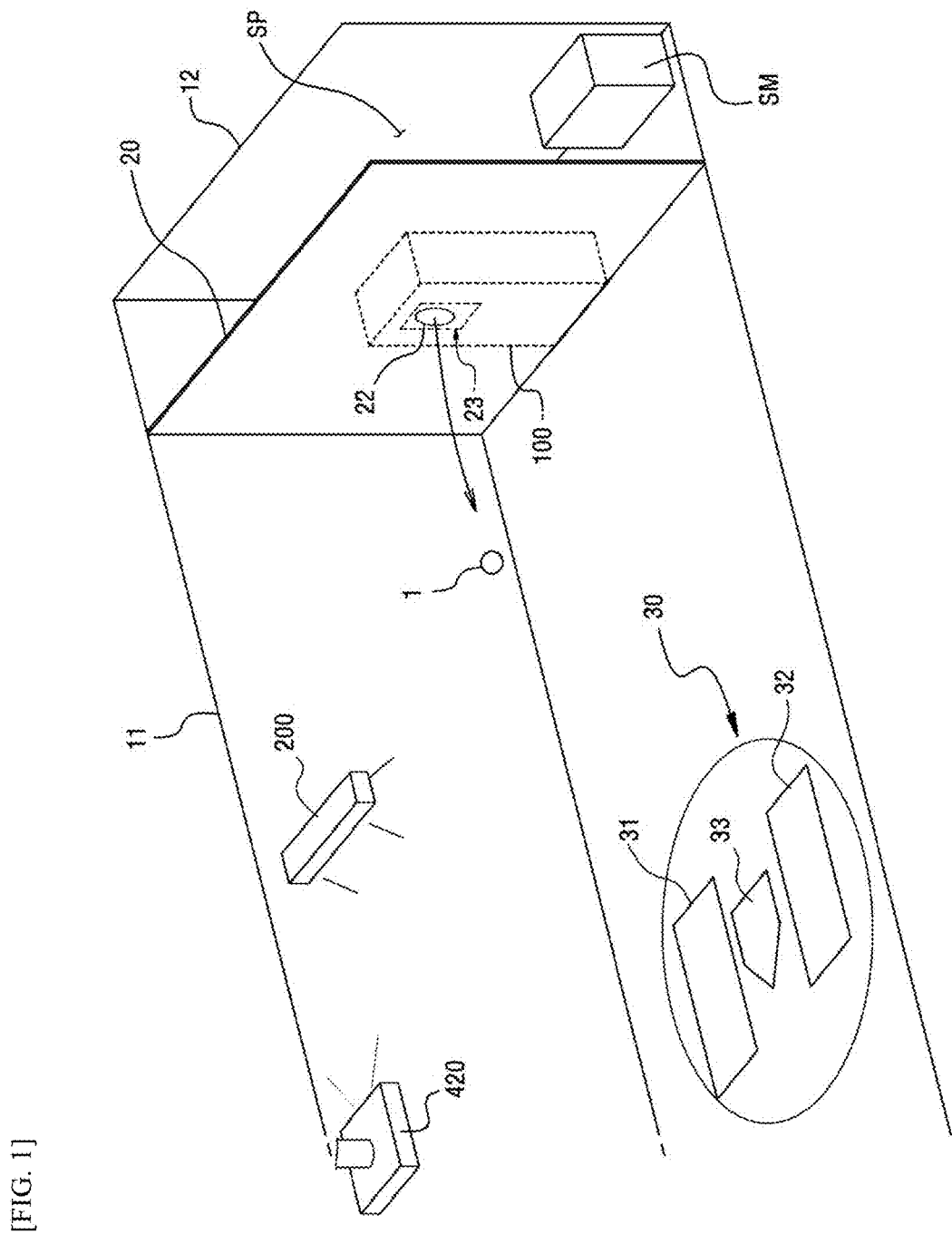
FIG. 1 shows an example of a virtual baseball simulation system, that is, a so-called screen baseball system, implemented as a baseball practice apparatus according to an embodiment of the present invention.
Figure 2:
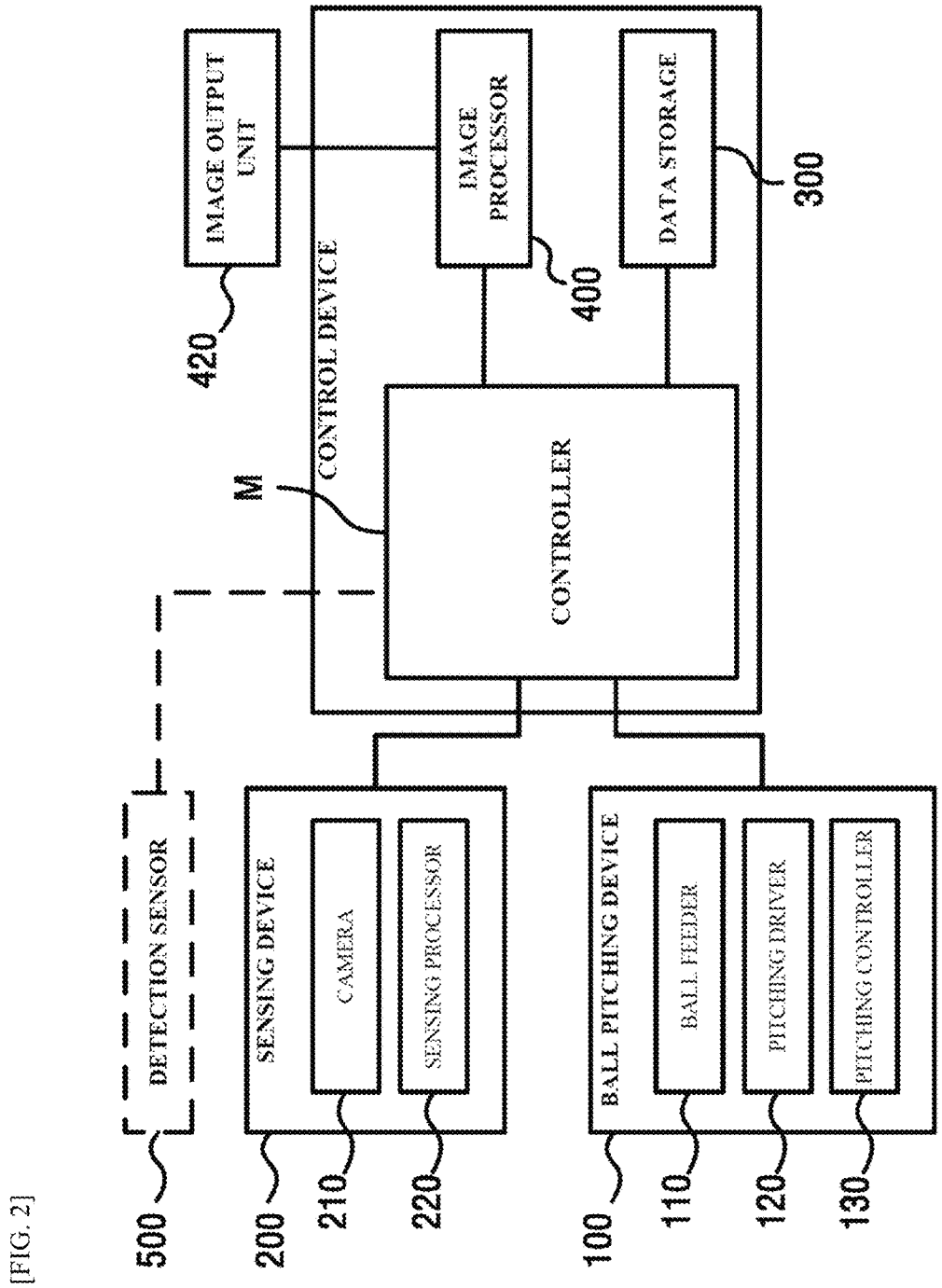
FIG. 2 is a block diagram showing a configuration of the baseball practice apparatus shown in FIG. 1.

First, a baseball practice apparatus according to an embodiment of the present invention will be described with reference to FIGS. 1 and 2. FIG. 1 shows an example of a virtual baseball simulation system, that is, a so-called screen baseball system, implemented as a baseball practice apparatus according to an embodiment of the present invention, and FIG. 2 is a block diagram showing a configuration of the baseball practice apparatus shown in FIG. 1.

Similar to a typical screen baseball system, the baseball practice apparatus according to an embodiment of the present invention includes a batting area 30 and a screen portion 20, which are arranged in a space defined by a side wall 11 and a rear wall 12, and is implemented such that the user can bat with a bat in the batter's box 31 or 32 of the batting area 30 (wherein reference numeral 31 denotes the right-handed batter's box, and reference numeral 32 denotes the left-handed batter's box). Hereinafter, the right-handed batter's box and the left-handed batter's box will be collectively referred to as a "batter's box", which is hereinbelow defined as including at least one of the right-handed batter's box and the left-handed batter's box), as shown in FIG. 1.

A control device SM for processing information on a baseball simulation image to be projected on the screen portion 20 is provided in the space SP between the screen portion 20 and the rear wall 12 (the image processed by the control device SM is projected onto the screen portion 20 through an image output unit 420), a ball pitching device 100 capable of pitching a ball 1 toward the batting area 30 may be installed and a pitching hole 22 may be formed in the screen portion 20 at a position corresponding to a part of the ball pitching device 100 from which the ball is fired, such that the ball 1 can pass though the pitching hole.

As shown in FIG. 1, the ball pitching device 100 may include a hole opening/closing unit 23 for opening and closing the pitching hole 22 in the screen portion 20 in front thereof.

As shown in FIGS. 1 and 2, the control system of the baseball practice apparatus according to an embodiment of the present invention may include a control device SM, the ball pitching device 100, and the sensing device 200. If the sensing device 200 is configured to recognize a user preparing to bat in the batter's box, a separate detection sensor 500 is not needed. However, according to an embodiment, the control system may include the separate detection sensor 500.

As shown in FIG. 2, the ball pitching device 100 may include a ball feeder 110, a pitching driver 120, and a pitching controller 130.

The ball feeder 110 is a component that transports balls one by one from a storage box in which a plurality of balls is stored to the pitching driver 120, i.e., a position for pitching.

The pitching driver 120 is a component for pitching a ball fed by the ball feeder 110. The pitching driver 120 may be implemented in various ways. The pitching driver may be implemented so to rotate one wheel and pitch a ball placed between the wheel and the guide plate by rotational force of the wheel (e.g., Japanese Laid-Open Patent Application No. 2014-217468), to rotate two or more wheels, position a ball between the wheels and pitch the ball by the rotational force of the wheels (e.g., Korean Patent Application Publication No. 2014-0100685, Korean Patent No. 0411754, Korean Utility Model No. 0269859, etc.), or to throw a ball by rotating an arm holding the ball (e.g., Korean Patent No. 0919371).

Specific configurations of the ball feeder 110 and the pitching driver 120 have already been disclosed in various prior art documents, and therefore a detailed description thereof will be omitted.

The sensing device 200 analyzes a captured image and senses an object in the image. The sensing device 200 functions to acquire and analyze an image of a predetermined photographing range including the batting area 30 to calculate ball motion information about at least one of a ball pitched by the ball pitching device 100 and a ball hit by the user.

As shown in FIG. 2, the sensing device 200 may include a camera unit 210 and a sensing processor 220. The camera unit 210 successively acquires images of a predetermined photographing range including the batting area 30. The sensing processor 220 receives images from the camera unit 210 and performs image analysis according to preset conditions to determine whether or not the user has prepared to bat in the batter's box 31 or 32.

The sensing device 200 may calculate the ball motion information and transmit the ball motion information to the control device SM. The control device SM may implement a simulation image of the ball motion based on the received ball motion information and project the same onto the screen portion 20 through the image output unit 420.

Further, in addition to calculation of the ball motion information, the sensing device 200 of the baseball practice apparatus according to an embodiment of the present invention performs image analysis by performing predetermined image processing on the acquired images to sense whether or not the user has entered the batter's box 31 or 32 and whether or not the user has completed preparation for batting in the batter's box and generates a "Ready" signal.

The control device SM may include a data storage 300, an image processor 400, and a controller M as shown in FIG. 2.

The data storage 300 stores data for processing a baseball simulation image or the like in a screen baseball system. The data storage 300 may be configured to serve as a storage space to temporarily store data received from a server (not shown).

The image processor 400 processes the image data according to a preset program in order to generate various kinds of baseball simulation-related images including a background image such as an image of a virtual baseball field and images of players, umpires, an audience, and the like, an image of a virtual pitcher pitching a ball, and a simulation image of a trajectory of a ball hit by the user. The processed image is transmitted to the image output unit 420. The image output unit 420 outputs the received image by, for example, projecting the received the image onto to the screen portion 20 such that the user can see the image.

The controller M controls each component of the baseball practice apparatus according to the present invention and performs various operations for realizing a baseball simulation image.

The controller M functions to determine the time at which the pitching hole 22 is opened or closed by the hole opening/closing unit 23, the time at which preparation for ball pitching is performed by the ball pitching device 100, and the time at which a prepared ball is pitched (fired) and to send a control signal to instruct the pitching controller 130 to perform a corresponding operation.

The hole opening/closing unit 23 is basically controlled so as to keep the pitching hole 22 of the screen part 20 closed. When the hole opening/closing unit 23 keeps the pitching hole closed, an image projected on the screen portion may be naturally seen without being omitted at the position of the pitching hole.

The hole opening/closing unit 23 keeping the pitching hole closed is opened to open the pitching hole 22 before the pitching driver 120 of the ball pitching device 100 fires a ball. After the pitching driver 120 fires the ball, the hole opening/closing unit 23 closes the pitching hole 22 again.

The detection sensor 500 may be provided separately from the sensing device 200. The detection sensor 500 may be implemented as a load detection sensor installed under the batter's box 31 or 32. The load detection sensor may sense the load of the user and transmit the load to the control device SM. When the output value of the load detection sensor is greater than a preset value, the control device SM may recognize that the user is located in the batter's box.

The detection sensor 500 may be used alone regardless of the control device SM and be implemented as a switching sensor installed under the batter's box 31 or 32 to be switched on upon receiving a load greater or equal to a preset value. A light emission means (not shown) provided to the home base 33 of the batting area 30 may be configured to emit light when the switching sensor is switched on. When the sensing device 200 determines that the light emission means emits light through histogram analysis or brightness analysis of the home base 33 in image acquisition and analysis, it may be determined that the user is located in the batter's box 31 or 32. Details will be described later.

FIGS. 1 and 2 illustrates a case where the control device SM implements a baseball simulation image using the result of sensing of the sensing device 200 in the baseball practice apparatus according to an embodiment of the present invention. A baseball practice apparatus according to another embodiment of the present invention may include a ball pitching device 100 and a control device SM without the sensing device such that a user can simply practice batting. In this case, the control device SM may be implemented without a component such as the image processor 400 or the like.

The baseball practice apparatus configured simply for batting practice of the user as described above may include the detection sensor 500 to determine whether the user has entered the batter's box and completed preparation for batting.

A sensing method of a sensing device and a ball pitching control method used for a baseball practice apparatus according to an embodiment of the present invention will be described with reference to the flowchart shown in FIG. 3.

Figure 3:
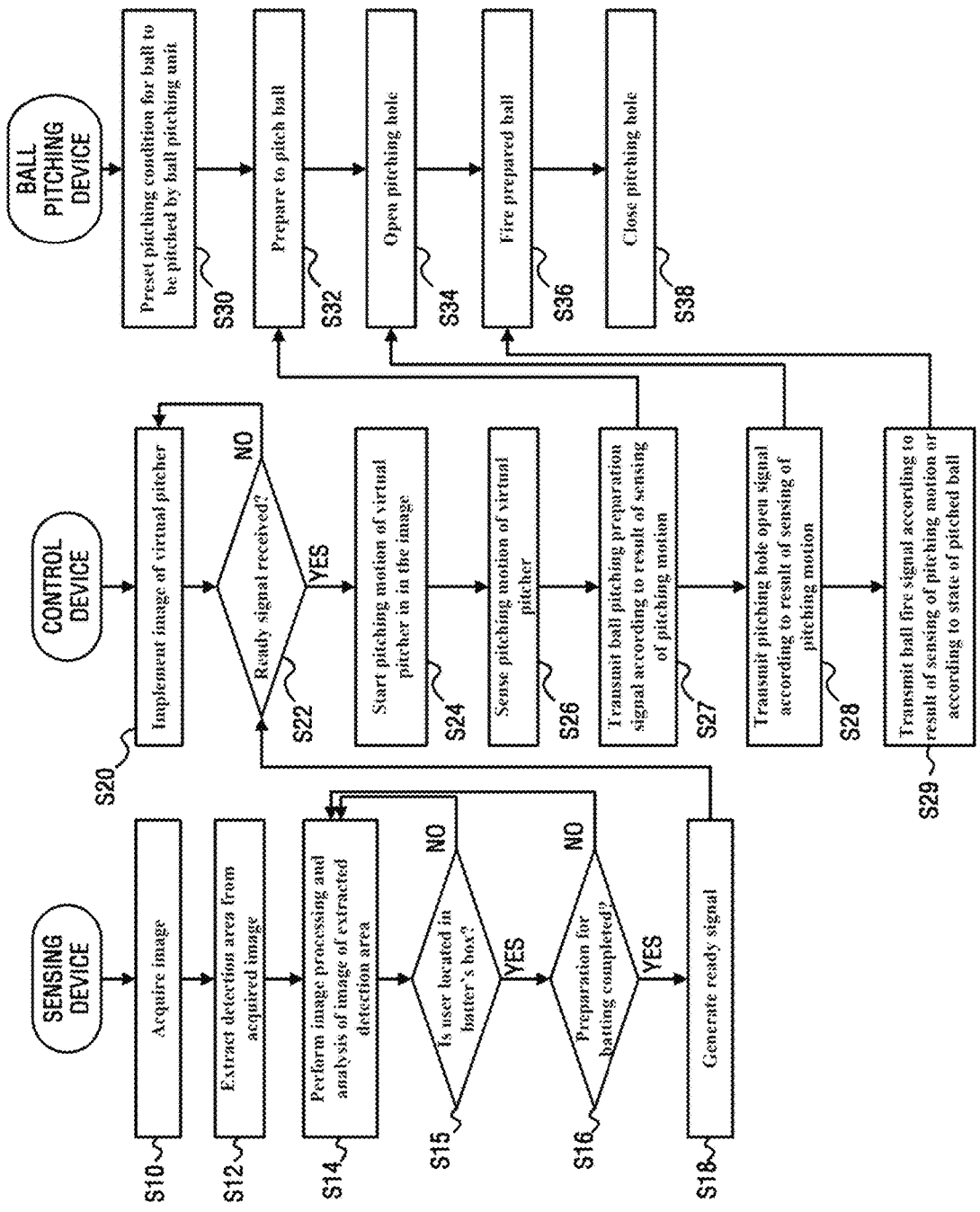
FIG. 3 is a flowchart illustrating a sensing method of a sensing device and a ball pitching control method of a control device in a baseball practice apparatus having the elements shown in FIG. 2.

FIG. 3 is a flowchart illustrating a sensing method of a sensing device and a ball pitching control method of a control device in a baseball practice apparatus having the elements shown in FIG. 2.

As shown in FIG. 3, as the baseball practice apparatus according to an embodiment of the present invention begins to operate, the sensing device successively acquires images of a predetermined photographing range including the batting area (S10).

Then, a detection area corresponding to the batter's box is extracted using the pre-stored position information about the batter's box from the acquired images (S12).

The detection area may include one or both of a first detection area corresponding to the left-handed batter's box and a second detection area corresponding to the right-handed batter's box (Namely, the first detection area refers to a part of the image corresponding to the left-handed batter's box and extracted from the image using pre-stored position information about the left-handed batter's box, and the second detection area refers to another part of the image corresponding to the right-handed batter's box and extracted from the image using pre-stored position information about the right-handed batter's box. Hereinafter, the "detection area" is defined as including either or both of the first detection area and the second detection area).

The position information about the batter's box (the left-handed batter's box and the right-handed batter's box) may be coordinate information about the batter's box pre-input by a system administrator or may be coordinate information that the sensing device obtains by acquiring an image at the beginning and specifying a part corresponding to the batter's box.

Once the sensing device extracts a detection area corresponding to the batter's box from the acquired image as described above, the sensing device performs image processing and analysis of the image of the extracted detection area according to the preset conditions (S14). The image processing and analysis may include one or all of various image analysis techniques such as histogram analysis, image edge analysis, contour specification and analysis of the space occupancy rate of the specified contour. Details will be described later.

Through the image processing and analysis in step S14, the sensing device determines whether the user is located in the batter's box (S15). For example, the sensing device analyzes change in the pixels constituting the extracted detection area image, and determines that the user is located in the batter's box if the change exceeds a predetermined level.

Then, while the user is located in the batter's box, the sensing device continues to perform image processing and analysis to determine whether the user has completed preparation for batting in the batter's box (S16). For example, if the change in the pixels constituting the detection area image exceeds a preset level for a preset time, the sensing device may determine that preparation for batting is completed in the batter's box.

As described above, the sensing device generates a ready signal upon determining that the user has completed preparation for batting in the batter's box (S18).

The control device prepares to execute baseball practice or a baseball game. For example, when an image of a virtual pitcher pitching a ball is to be implemented, an image of the virtual pitcher staying positioned before pitching the ball is pre-implemented (S20).

If the ready signal according to step S18 is generated while the control device prepares to execute the baseball practice or the baseball game, the control device receives the ready signal (S22), and the baseball practice or the baseball game is executed as an image showing the virtual pitcher of the image implemented in step S20 starting the pitching motion is implemented (S24).

The controller of the control device senses the pitching motion as the virtual pitcher starts the pitching motion (S26). The ball pitching device prepares for ball pitching according to the sensed pitching motion of the virtual pitcher and sends a control signal so as to fire a ball.

As shown in FIG. 3, when the user or another user has a preset pitching condition for a ball to be pitched by the ball pitching device (S30), the controller of the control device transmits a ball pitching preparation signal to the ball pitching device according to the result of sensing of the pitching motion (S27). Upon receiving the ball pitching preparation signal, the ball pitching device prepares to pitch the ball according to the pitching condition preset in step S30 such that a ball can be fired (S32).

For example, when a specific pitching motion (e.g., a setup motion, a windup motion, etc.) of the virtual pitcher triggering transmission of the ball pitching preparation signal is sensed, the controller may transmit the ball pitching preparation signal to the ball pitching device, and the ball pitching device may prepare for pitching by setting the pitching direction or adjusting the rotation speed of the pitching driver by driving the up-down or left-right rotation such that the ball can be fired according to the pitching condition.

Next, the controller of the control device transmits a pitching hole open signal to the ball pitching device to open the pitching hole formed in the screen portion according to the result of sensing of the pitching motion of the virtual pitcher (S28).

The ball pitching device may open the hole opening/closing unit to open the pitching hole according to the pitching hole open signal (S34).

Here, when a specific pitching motion of the virtual pitcher, for example, a motion of lifting one leg after the windup motion or a motion of landing one leg on the floor) triggering transmission of the pitching hole open signal is sensed, the controller transmits the pitching hole open signal to the ball pitching device, and the ball pitching device drives the hole opening/closing unit to open the pitching hole.

Next, the controller of the control device transmits a ball fire signal to the ball pitching device according to the result of sensing of the pitching motion of the virtual pitcher or according to the state of the ball pitched by the virtual pitcher, and the ball pitching device fires a ball prepared in step S32 toward the batting area upon receiving the ball fire signal (S36).

Here, when a specific pitching motion of the virtual pitcher triggering transmission of the ball fire signal is sensed (for example, a pitching motion such as release or follow-through), the controller transmits the ball fire signal to the ball pitching device, and the ball pitching device fires a prepared ball.

Alternatively, the controller may transmit the ball fire signal to the ball pitching device when the trigger for transmitting the ball fire signal is not a pitching motion of the virtual pitcher, but the state or position of the ball pitched by the pitcher is specified and sensed. For example, the controller may transmit the ball fire signal to the ball pitching device at a point in time when the ball pitched by the virtual pitcher disappears from an image.

It is important to control the pitching motion of the virtual pitcher in the image or the state or location of the pitched ball to be synchronized with firing of the ball from the ball pitching device to make the user feel as if a real pitcher is pitching.

If there is a time delay until the ball pitching device actually fires a ball after the controller transmits the ball fire signal to the ball pitching device, the time delay may be pre-measured and the term from the time of transmission of the ball fire signal to the time when the ball is actually fired may be controlled to coincide with the delay time described above.

After the ball is fired, the ball pitching device may drive the hole opening/closing unit to close the pitching hole of the screen portion again (S38).

The flowchart shown in FIG. 3 corresponds to a case where the baseball practice apparatus according to an embodiment of the present invention is implemented as a virtual baseball simulation system. However, the baseball practice apparatus according to the present invention is not necessarily limited thereto. A baseball practice apparatus that enables baseball practice may be implemented without the sensing device and a component enabling implementation of a simulation image in such a manner that a user hits a ball fired by the ball pitching device in the batter's box. In this case, since there is no sensing device, a detection sensor may be provided to determine whether or not the user is located in the batter's box and whether or not the user has prepared to bat in the batter's box.

Of course, the detection sensor can also be used in the baseball practice apparatus according to the present invention that has the sensing device.

Hereinafter, with reference to FIGS. 4 and 5, a description will be given of a case where the sensing device used in the baseball practice apparatus according to the flowchart shown in FIG. 3 determines whether the user is located in the batter's box and whether the batting preparation made by the user is completed, through the processing and analysis of the images.

Figure 4:
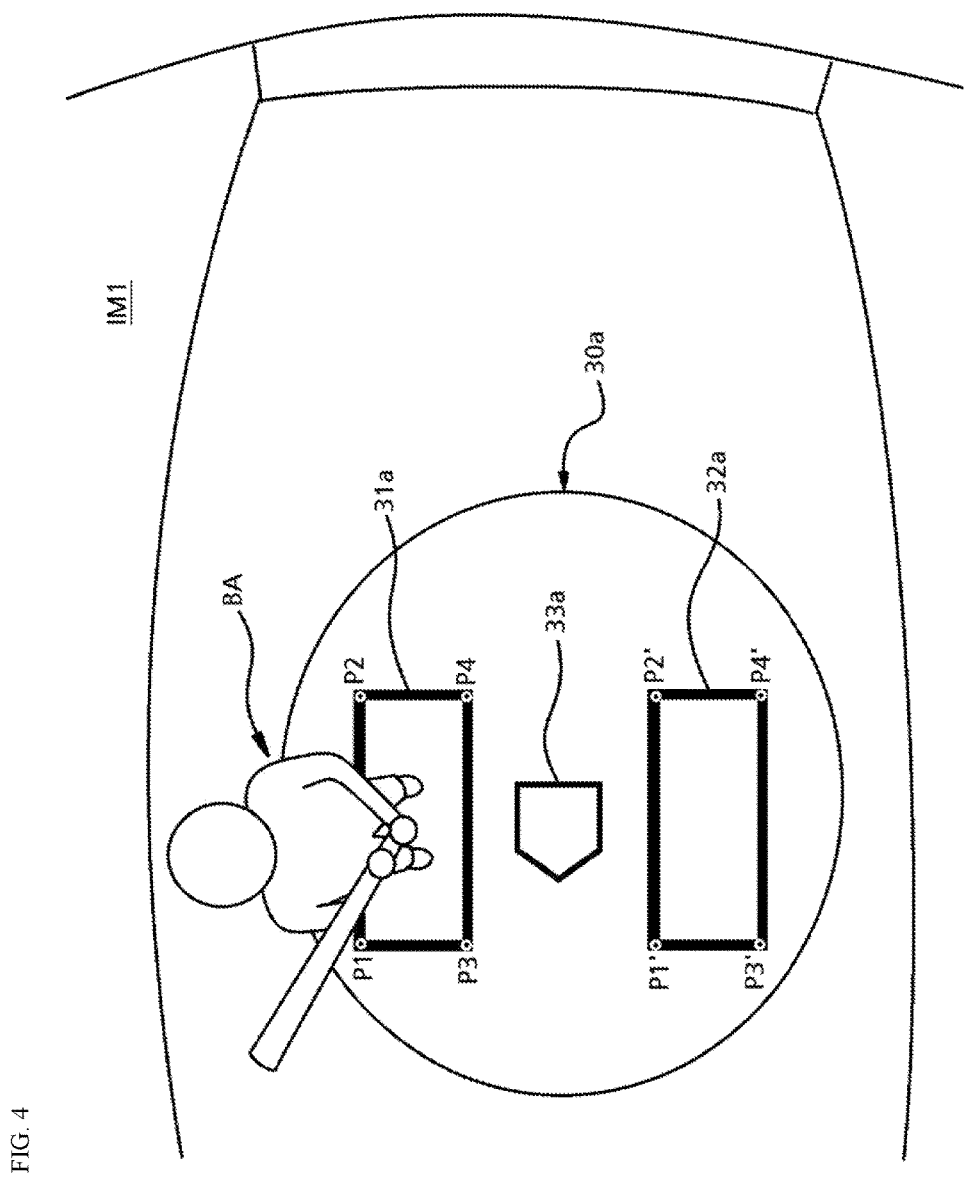
FIG. 4 shows an image portion for a batting area in an image acquired by a sensing device used in a baseball practice apparatus according to an embodiment of the present invention.

FIG. 4 shows an image portion for a batting area in an image IM1 acquired by a sensing device used in a baseball practice apparatus according to an embodiment of the present invention.

In the image IM1 shown in FIG. 4 compared with the batting area 30 shown in FIG. 1, a portion corresponding to the batting area 30 is denoted by 30a, a portion corresponding to the right-handed batter's box 31 is denoted by 31a, a portion corresponding to the right-handed batter's box 32 is denoted by 32a, and a portion corresponding to the home base 33 is denoted by 33a.

The sensing device used in the baseball practice apparatus according to an embodiment of the present invention may pre-store basic coordinate information about the portions 31a and 32a of the image corresponding to the batter's box in order to sense whether the user is located in the batter's box.

In the case of FIG. 4, the sensing device pre-stores coordinate information (P1, P2, P3, and P4) on four corners of the portion 31a corresponding to the right-handed batter's box of a rectangular shape. Upon acquiring an image, the sensing device extracts, as a first detection area, an area corresponding to the coordinate information and a rectangular shape having the coordinate information as the vertices thereof. Similarly, the sensing device pre-stores coordinate information (P1', P2', P3', and P4') on four corners of the portion 32a corresponding to the left-handed batter's box, and extracts the corresponding portion as a second detection area.

That is, the sensing device used in the baseball practice apparatus according to the embodiment of the present invention shows pre-stored coordinate information (P1 to P4 and P1' to P4') on the batter's box needed to extract the detection area from the acquired image or an image IM1 obtained by performing predetermined processing of the acquired image, as shown in FIG. 4.

FIG. 5(a) shows an example of an image 250 of the detection area extracted using the method described above. The method of extracting the detection area and performing image processing and analysis is the same for the right-handed batter's box and the left-handed batter's box. Therefore, in the following description, both batter's boxes and the corresponding detection areas will be commonly referred to as "batter's box" and "detection area".

The detection area image 250 shown in FIG. 5(a) contains an object Ob which is clearly different from the surrounding part when the user is positioned in the batter's box. In order to determine whether the object Ob corresponds to the user, the sensing device may use histogram analysis as shown in FIG. 5(b), image edge analysis as shown in FIG. 5(c), or contour detection and analysis of the occupancy ratio of the contour as shown in FIG. 5(d).

FIG. 5(b) shows histogram analysis information 260 about the respective pixel values of the pixels of the detection area image 250, and FIG. 5(c) shows an image edge R1 detected in an image 270 after preprocessing such as image normalization of the detection area image 250. FIG. 5(d) shows a contour R2 of an object in an image 280 after preprocessing such as image normalization of the detection area image 250.

Referring to FIGS. 1 and 5, even before the user takes bat and enters the batter's box 31 or 32 of the batting area 30, the sensing device continuously acquires and analyzes images of a predetermined size including the batting area.

When the user enters the batter's box 31 or 32, the sensing device may generate histogram analysis information 260 about the acquired image to analyze change in the histogram of the pixels, may generate information on the image edge R1 in the preprocessed image 270 to analyze the number of image edges, or may generate information on the contour R2 of the object in the preprocessed image 280 to analyze the occupancy ratio of the generated object contour to the entire detection area image. Thereby, the sensing device may determine whether or not the user is located in the batter's box.

When the user is outside the batter's box, the histogram change, the image edge R1 and the object contour R2 are not significantly varied. When the user is in the batter's box, the histogram change, the image edge R1 and the object contour R2 are significantly varied.

That is, the histogram analysis information 260 is used to analyze the histogram. If the histogram changes beyond a preset level as a result of the analysis, the sensing device may determine that the user is located in the batter's box. If the number of image edges R1 detected as a result of analysis of the image edges is greater than or equal to a preset number, it may be determined that the user is located in the batter's box. If the detected proportion of the size of the contour R2 in the entire detection area is higher than or equal to a preset value as a result of analysis of the contour R2 of the object, the sensing device may determine that the user is located in the batter's box.

Here, the preset level of change of the histogram, the preset number of image edges, and the preset proportion of occupancy of the object contour are pre-input and set by a system developer or a system administrator.

Accordingly, in order to prevent inaccurate detection of the location of the user in the batter's box as in a case where the user is not in the batter's box or a case where the user ambiguously enters the batter's box and to improve accuracy of sensing of the user in detecting a portion BA corresponding to the user appearing in the image as shown in FIG. 4, the sensing device may extract a portion corresponding to the batter's box as a detection area and perform image analysis on only the extracted detection area to determine the location of the user. Therefore, the accuracy of the determination and the processing speed may be enhanced.

Hereinafter, a baseball practice apparatus, a sensing device and a sensing method used therefor, and a ball pitching control method according to another embodiment of the present invention will be described with reference to FIG. 6.

The baseball practice apparatus according to the embodiment shown in FIG. 6 is implemented as a virtual baseball simulation system, which is substantially the same as the baseball practice apparatus shown in FIG. 1, but has a difference in that a detection sensor is installed in the batter's boxes 31 and 32, and a light emitting means 35 is provided to the home base 33. It also has a difference in determining, through the sensing device, whether or not the user is located in the batter's box and whether or not preparation for batting is completed.

That is, the components, such as the screen portion 20, the batting area 30, the ball pitching device 100, the control device SM, and the sensing device 200 are substantially the same as those of the baseball practice apparatus shown in FIG. 1, and therefore a detailed description thereof will be omitted. Hereinafter, description will be mainly focused on the differences of the baseball practice apparatus according to the embodiment shown in FIG. 6 from the baseball practice apparatus according to the embodiment shown in FIG. 1.

The baseball practice apparatus according to the embodiment shown in FIG. 6 includes a detection sensor, as a means for sensing whether a user is located in the batter's box. Specifically, the detection sensor is implemented by a switching sensor 510.

In addition, a light emitting means 35 such as an LED is provided to the home base 33 and is connected to the switching sensor 510.

The switching sensor 510, which is connected between a power source and the light emitting means, continues to interrupt electrical connection between the power source and the light emitting means 35. Then, when the user is positioned in the batter's box and thus a load greater than or equal to a preset value is applied, the switching sensor performs switching to electrically connect the power source to the light emitting means 35 to allow the light emitting means 35 to emit light.

When the light emitting means 35 on the home base 33 emits light, the sensing device may check whether or not light is emitted through analysis of an acquired image.

For example, the sensing device may extract a region of interest using the coordinate information on the home base 33 in the same manner as the extraction of the detection area described above with reference to FIGS. 4 and 5. When the pixel values of the region of interest are analyzed, it may be found that the pixel values given before the light emitting means 35 in the home base 33 emits light are significantly different from those given after the light emitting means 35 emits light, in terms of brightness of the pixels. Accordingly, the sensing device may sense the difference through image processing and analysis, thereby recognizing that the user is located in the batter's box.

If the user remains located in the batter's box for a certain time or longer, the light emitting means 35 of the home base 33 persistently emits light. Accordingly, when the time for which emission of light from the light emitting means is maintained is sensed and it is determined that the light emission is maintained for a time long than or equal to a preset time, the sensing device generates a ready signal, determining that the user has completed preparation for batting. Once the ready signal is generated, the baseball game begins.

The light emitting means may be provided in the batter's box 31 or 32 rather than in the home base 33 or may be provided anywhere in the batting area 30. The sensing device does not necessarily extract the region of interest using the predetermined coordinate information, but may extract and analyze a portion exhibiting great enhancement in brightness compared to the previous brightness thereof in the entire image as a result of analysis of the entire image, thereby causing the ready signal to be generated.

INDUSTRIAL APPLICABILITY

The baseball practice apparatus, the sensing device and the sensing method used therefor, and the ball pitching control method according to the present invention are industrially applicable in a technical field that allows a user to perform baseball practice or play a virtual baseball game in a manner that a user hits a ball fired by the ball pitching device with a bat in an indoor space of a predetermined size, and the sensing device senses hitting and implements a simulation image on a screen in front of the user in front of the user.

The invention claimed is:

1. A baseball practice apparatus for allowing a user to practice baseball or play a game of baseball based on a virtual baseball image, the baseball practice apparatus comprising:
    a ball pitching device configured to pitch a ball toward a batting area where a user bats;
    a sensing device configured to calculate ball motion information about at least one of a ball pitched by the ball pitching device and a ball hit by the user by acquiring and analyzing an image of a predetermined photographing range including the batting area and to perform an image analysis of the acquired image according to preset conditions to determine whether the user has prepared for batting in the batting area; and
    a control device configured to implement a simulation image of ball motion based on the ball motion information calculated by the sensing device and to proceed with the baseball practice or the game of baseball when the sensing device determines that the user has prepared to bat.

2. The baseball practice apparatus according to claim 1, wherein the sensing device comprises:
    a camera unit configured to successively acquire an image of the predetermined photographing range including the batting area; and
    a sensing processor configured to receive an image from the camera unit and analyze the image according to preset conditions to determine whether or not the user has prepared to bat in the batting area.

3. The baseball practice apparatus according to claim 1, wherein the batting area comprises a home base and a batter's box where the user is positioned to bat,
    wherein the sensing device is configured to:
    pre-store information on a position of the batter's box in the image; and
    extract a detection area corresponding to the batter's box from the acquired image using the pre-stored information on the position of the batter's box and determine, through an image analysis of the detection area, whether or not the user has prepared to bat in the batter's box.

4. The baseball practice apparatus according to claim 3, wherein the sensing device determines whether the user is located in the batter's box by analyzing a change in pixels of the extracted detection area, and sends, when it is determined that the user is positioned in the batter's box and stays in the batter's box for a preset time, a ready signal to the control device, determining that the user has completed preparation for batting in the batter's box,
    wherein, upon receiving the ready signal from the sensing device, the control device causes a pitching image of a virtual pitcher to be implemented and an operation to be performed according to a preset process of the ball pitching device such that the baseball practice or the game of baseball is executed.

5. The baseball practice apparatus according to claim 1, wherein the batting area comprises a left-handed batter's box, a right-handed batter's box and a home base where the user is positioned to bat,
    wherein the sensing device is configured to:
    pre-store information on positions of the left-handed batter's box and the right-handed batter's box in the image; and
    extract a first detection area corresponding to the left-handed batter's box and a second detection area corresponding to the right-handed batter's box from the acquired image using the pre-stored information on the positions of the left-handed batter's box and the right-handed batter's box and determine, through an image analysis of each of the first detection area and the second detection area, whether the user is in the left-handed batter's box or in the right-handed batter's box and whether the user has prepared to bat in the left-handed batter's box or the right-handed batter's box.

6. The baseball practice apparatus according to claim 1, further comprising a detection sensor configured to sense whether the user is located in a batting area,
    wherein the batting area comprises a home base and a batter's box where the user is positioned to bat, the home base being provided with a light emitting means,
    wherein the light emitting means of the home base emits light when the detection sensor senses that the user is located in the batter's box,
    wherein the sensing device analyzes the acquired image and transmits, to the control device, information about whether or not the light emitting means emits light and a time duration of emission of light, and the control device determines whether the user has completed preparation for batting using the received information.

7. A method of controlling ball pitching of a baseball practice apparatus allowing a user to practice baseball or play a game of baseball in a manner that the user hits a ball pitched by a ball pitching device based on a virtual baseball image, the method comprising:
    successively acquiring, by a sensing device configured to sense ball motion, an image of a predetermined photographing range including a batting area where the user bats;
    determining, by the sensing device, whether or not the user has prepared to bat in the batting area by performing an image analysis of the acquired image according to preset conditions; and
    generating a ready signal for driving the ball pitching device when it is determined through the image analysis that the user has completed preparation for batting.

8. The method according to claim 7, wherein the sensing device pre-stores information on a position of the batting area in the image,
    wherein the determining of whether or not the user has prepared to bat comprises:
    extracting a detection area corresponding to the batting area from the acquired image using the pre-stored information on the position of the batting area; and
    determining, through an image analysis of the detection area, whether or not the user has prepared to bat in the batting area.

9. The method according to claim 8, wherein the determining of whether or not the user has prepared to bat comprises:
    detecting image edges through predetermined image processing on an image of the extracted detection area,
    determining that the user is located in the batting area when a number of image edges is detected to be greater than or equal to a preset number;

determining that the user has completed preparation for batting when the number of the image edges detected to be greater than or equal to the preset number continues for a preset time.

10. The method according to claim 8, wherein the determining of whether or not the user has prepared to bat comprises:
    detecting an object in the image through predetermined image processing on an image of the extracted detection area;
    determining that the user is located in the batting area when a proportion of a size of the detected object occupying the detection area is detected to be greater than or equal to a preset value; and
    determining that the user has completed preparation for batting when the object having the proportion detected to be greater than or equal to the preset value continues for a preset time.

11. The method according to claim 8, wherein the determining of whether or not the user has prepared to bat comprises:
    analyzing a change in a histogram of pixels of the extracted detection area;
    determining that the user is located in the batting area when the change in the histogram is higher than or equal to a preset level; and
    determining that the user has completed preparation for batting when the change in the histogram higher than or equal to the predetermined level continues for a preset time.

12. The method according to claim 7, wherein the batting area comprises a left-handed batter's box and a right-handed batter's box,
    wherein the sensing device pre-stores information on positions of the left-handed batter's box and the right-handed batter's box in the image,
    the determining of whether or not the user has prepared to bat comprises:
    extracting a first detection area corresponding to the left-handed batter's box and a second detection area corresponding to the right-handed batter's box from the acquired image using the pre-stored information on the positions of the left-handed batter's box and the right-handed batter's box
    determining, through an image analysis of each of the first detection area and the second detection area, whether the user is in the left-handed batter's box or in the right-handed batter's box and whether the user has prepared to bat in the left-handed batter's box or the right-handed batter's box.

13. The method according to claim 7, the method further comprising, when the ready signal is generated:
    implementing, by an image implementation means of the baseball practice apparatus, a pitching image of a virtual pitcher; and
    firing, by the ball pitching device, a ball toward the batting area according to the implemented pitching image of the virtual pitcher or a ball pitched by the virtual pitcher.

14. The method according to claim 13, wherein the firing of the ball toward the batting area by the ball pitching device comprises:
    sensing at least one of a pitching motion of the virtual pitcher in the implemented image and the ball pitched by the virtual; and
    firing, the ball pitching device, the ball toward the batting area in response to the sensed pitching motion of the virtual pitcher or the ball pitched by the virtual pitcher.

15. A sensing method of a sensing device used in a baseball practice apparatus configured to calculate ball motion information about at least one of a ball pitched by the ball pitching device and a ball hit by a user by acquiring and analyzing an image of a predetermined photographing range including a batting area where the user bats and to be used for a baseball practice apparatus configured to implement a simulation image of ball motion based on the calculated ball motion information, the method comprising:
    successively acquiring an image of the predetermined photographing range including the batting area; and
    performing an image analysis of the acquired image according to preset conditions and determining whether or not the user has prepared to bat in the batting area; and
    sending a ready signal to a control device of the baseball practice apparatus when it is determined that the user has prepared to bat.

16. The sensing method according to claim 15, wherein the batting area comprises a home base and a batter's box where the user is positioned to bat,
    wherein the sensing device pre-stores information on a position of the batter's box in the image,
    wherein the determining of whether or not the user has prepared to bat comprises:
    extracting a detection area corresponding to the batting area from the acquired image using the pre-stored information on the position of the batter's box; and
    determining, through an image analysis of the detection area, whether or not the user has prepared to bat in the batting area.

17. The sensing method according to claim 16, wherein the determining of whether or not the user has prepared to bat comprises:
    performing at least one of a histogram change analysis, an image edge change analysis, and an object change analysis on pixels of the extracted detection area;
    determining that the user has completed preparation for batting when a change occurs beyond a preset level and the change continues for a preset time.

* * * * *